BEST AVAILABLE COPY

C. Newhall.
Mower.

No. 3331. Reissued Mar. 16. 1869.

Witnesses:

C. H. Smith
Jos. S. Peyton

Inventor:

Cyrus Newhall
by Guy his Atty
Beal drawing down

UNITED STATES PATENT OFFICE.

CYRUS NEWHALL, OF HINSDALE, NEW HAMPSHIRE.

IMPROVEMENT IN HARVESTERS.

Specification forming part of Letters Patent No. 36,017, dated July 29, 1862; Reissue No. 3,331, dated March 16, 1869.

*To all whom it may concern:*

Be it known that I, CYRUS NEWHALL, of Hinsdale, in the county of Cheshire and State of New Hampshire, have invented certain new and useful Improvements in Grain and Grass Harvesters, of which the following is a full, clear, and exact description, reference being had to the accompanying drawings, which make part of this specification, and in which—

Figure 1:
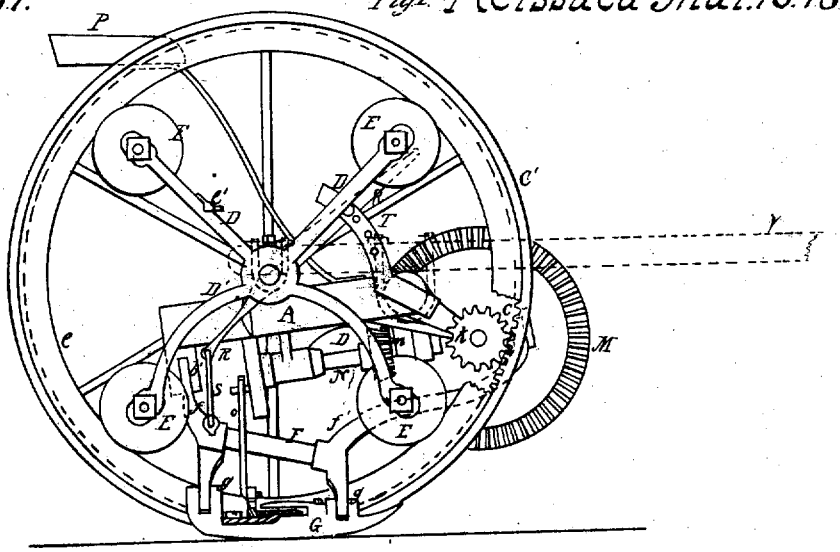
Figure 2:
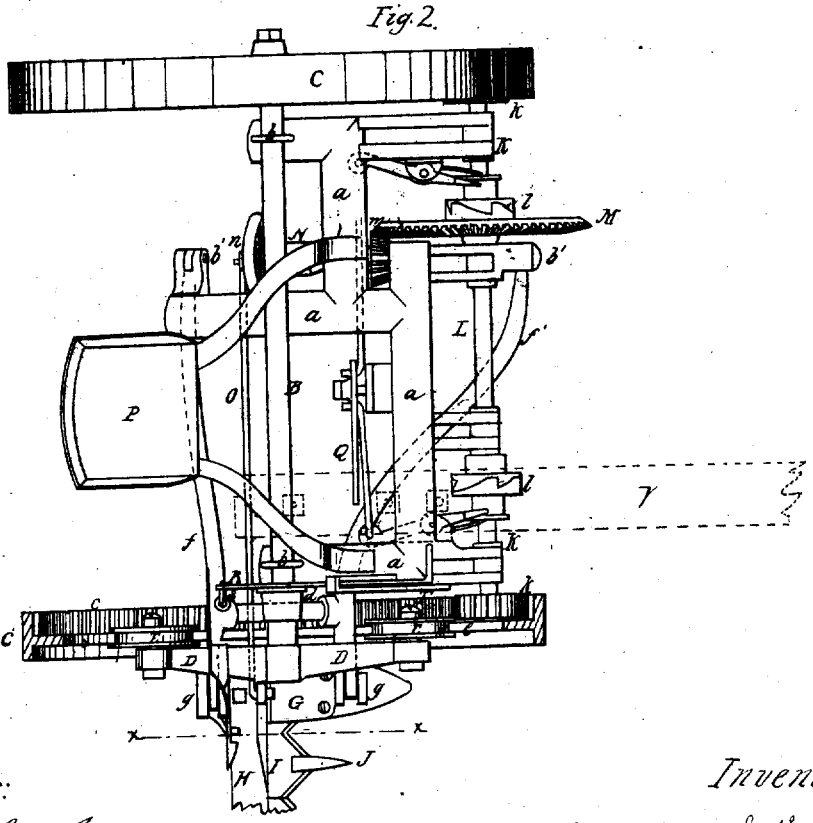

Figure 1 represents a view in elevation of the gearing side of a machine embracing my improvements, as seen from the divider end of the finger-beam, with the latter in section at the line *x x* of Fig. 2, which latter figure represents a plan or top view of the machine with the rim of the inner driving-wheel broken away.

It is the object of my invention to use in a harvester a cutting apparatus projecting laterally from the machine in the line of the main axle; and to this end the improvements herein claimed consists, first, in a novel method of combining with a harvester a finger-beam projecting laterally from the machine in substantially the same vertical plane as the main axle, with which it is connected by couplings passing through the driving-wheel; second, in a novel method of combining with a harvester a finger-beam suspended from the main frame by hinged connections passing through the driving-wheel; third, in a novel method of combining in a harvester two driving and supporting wheels, a main frame, and a laterally-projecting finger-beam suspended from the main frame by hinged couplings, the frame, finger-beam, and coupling-frame all being arranged within the periphery of the wheels; fourth, in a novel method of combining in a harvester a laterally-projecting finger-beam with cutters driven by a pitman passing through the driving-wheel.

In order to carry out the objects of my invention, I mount a suitable main frame for carrying the driving-gearing on two driving-wheels, the outer one of which is of the ordinary construction. The inner driving-wheel, or that next the standing grain, instead of having spokes attached to and revolving with the rim and hub in the usual way, is composed of an annular rim revolving on friction-rollers sustained on fixed arms bolted to the axle. A finger-beam and cutting apparatus project laterally from the machine in the line of the axle, and are connected with the main frame by coupling-arms hinged to the frame and to the shoe, and passing through the wheel. The coupling-frame and finger-beam are raised or lowered by a lifting device on the frame. A catch on one of the arms of the inner driving-wheel supports the cutting apparatus when folded up for transportation.

In the accompanying drawings, which show one convenient way of carrying out the objects of my invention, the main frame A is shown as composed of metal tubes *a*, which mode of construction secures strength, durability, and lightness. The frame is attached by loops *b* to a fixed axle, B. A driving-wheel, C, of ordinary construction, is mounted loosely on the outer end of the axle, while a series of arms, D D′, are attached permanently to its inner end. Each arm carries on its outer end a grooved friction-roller, E, in which the rib or flange *e* of the annular rim C runs. By this mode of construction the rim revolves on the friction-rollers and acts as a driving-wheel, the arms D D′ remaining stationary. The lower arms, D′, are bowed, so as to leave room for the coupling-frame F to play between them. This frame consists of two coupling-arms, *f f′*, hinged to the main frame at their upper ends by pivots *b′*, and at their lower ends by pivots *g* to the shoe, and connected near their lower ends by a brace, *d*. The coupling-frame F is thus free to play vertically.

The inner end of the finger-beam H is secured to the shoe G, which rocks vertically on the pivots *g*, to allow the divider end of the finger-beam to rise and fall independently of the heel end. The finger-beam is so arranged that it may be turned up vertically against one of the arms D and held there by a catch, *e′*, on one of the arms, D.

A balance-lever, R, fulcrumed on the axle, is connected with the coupling-frame F by a link-rod or chain, S. The front end of this lever plays in a sector-guide, T, on the frame provided with a series of holes, in which a pin may be inserted to hold the coupling-frame at any desired height. By this means the shoe and finger-beam can be raised from the ground. When thus raised, turned up vertically, and held by the catch, the finger-beam is out of the way, and the machine can readily pass through gates in moving from field to field. The grain end of the finger-beam is provided with a suitable divider and grain-wheel.

Scalloped cutters I are arranged to reciprocate over suitable guard-fingers, J, attached to the finger-beam.

Internally-geared spur-wheels *c* on the driving wheel and rim C C′ drive corresponding pinions on independent short shafts K, connected by sliding clutches *l* with a counter-shaft, L, carrying a bevel-wheel, M, driving a corresponding pinion on a crank-shaft, N, carrying a crank, *n*, which drives the cutters through a pitman, O, in the usual way.

A seat, P, for the driver is mounted on a standard rigidly secured to the axle in a position from which he can easily reach the lifting-lever Q, as well as the shipping-levers. A tongue, V, is bolted to the axle and to the frame by loops, so that it may be adjusted laterally to regulate the side draft.

By the above-described method of connecting the finger-beam and main frame I am enabled to use a cutting apparatus projecting laterally in the line of the axle, and to secure a direct connection between the cutters and their crank-shaft.

What I claim is—

1. The combination, in a harvester, of a loose driving gear-ring revolving on fixed arms, with a finger-beam suspended from the main frame by connections passing through the driving-ring.

2. The combination, with a two-wheeled harvester, of a finger-beam hinged to the main frame by coupling-arms passing through one of the driving-wheels.

3. The combination, substantially as set forth, in a harvester, of two wheels, a main frame, a laterally-projecting hinged finger-beam, and a coupling-frame, when the main frame, the finger-beam, and the couplings are all arranged within the periphery of the wheels.

4. The combination, in a harvester, of a laterally-projecting finger-beam, with cutters driven by a pitman passing through the driving-wheel.

In testimony whereof I have hereunto subscribed my name.

CYRUS NEWHALL.

Witnesses:
E. M. FORBES,
W. N. WOODWARD.